United States Patent [19]
van der Lely et al.

[11] 4,018,289
[45] Apr. 19, 1977

[54] SOIL CULTIVATING TINES

[76] Inventors: Ary van der Lely, 10, Weverskade, Maasland; Cornelis Johannes Gerardus Bom, 36, Esdoornlaan, Rozenburg, both of Netherlands

[22] Filed: Jan. 6, 1975

[21] Appl. No.: 539,036

[30] Foreign Application Priority Data

Jan. 10, 1974 Netherlands ............... 7400328

[52] U.S. Cl. .................. 172/713; 172/59; 172/526

[51] Int. Cl.² ............................. A01B 23/02

[58] Field of Search ........... 172/59, 713, 522, 523, 172/524, 525, 526, 111, 110

[56] References Cited

UNITED STATES PATENTS

| | | | |
|---|---|---|---|
| 231,257 | 8/1880 | Barley | 172/713 |
| 282,223 | 7/1883 | Reiner | 172/713 X |
| 1,033,574 | 7/1912 | Freeman | 172/713 |
| 3,902,560 | 9/1975 | Van Der Lely | 172/59 |

FOREIGN PATENTS OR APPLICATIONS 468,491  11/1928  Germany ................ 172/713

*Primary Examiner*—George J. Marlo
*Attorney, Agent, or Firm*—Mason, Mason & Albright

[57] ABSTRACT

A rotary harrow or cultivator tine has an upper fastening portion that is tightly received in a holder. The fastening portion is integral with a lower soil working portion that terminates in a tip and the two portions are angled with respect to one another. The soil working portion has a generally round cross section for a part of its length that is tapered outwardly to form a leading rib with respect to the intended direction of rotation of the tine. In the lower region adjacent the tip, the cross section of the soil working portion becomes less round and can merge into a polygonal cross section region having grooves and flat sides.

6 Claims, 14 Drawing Figures

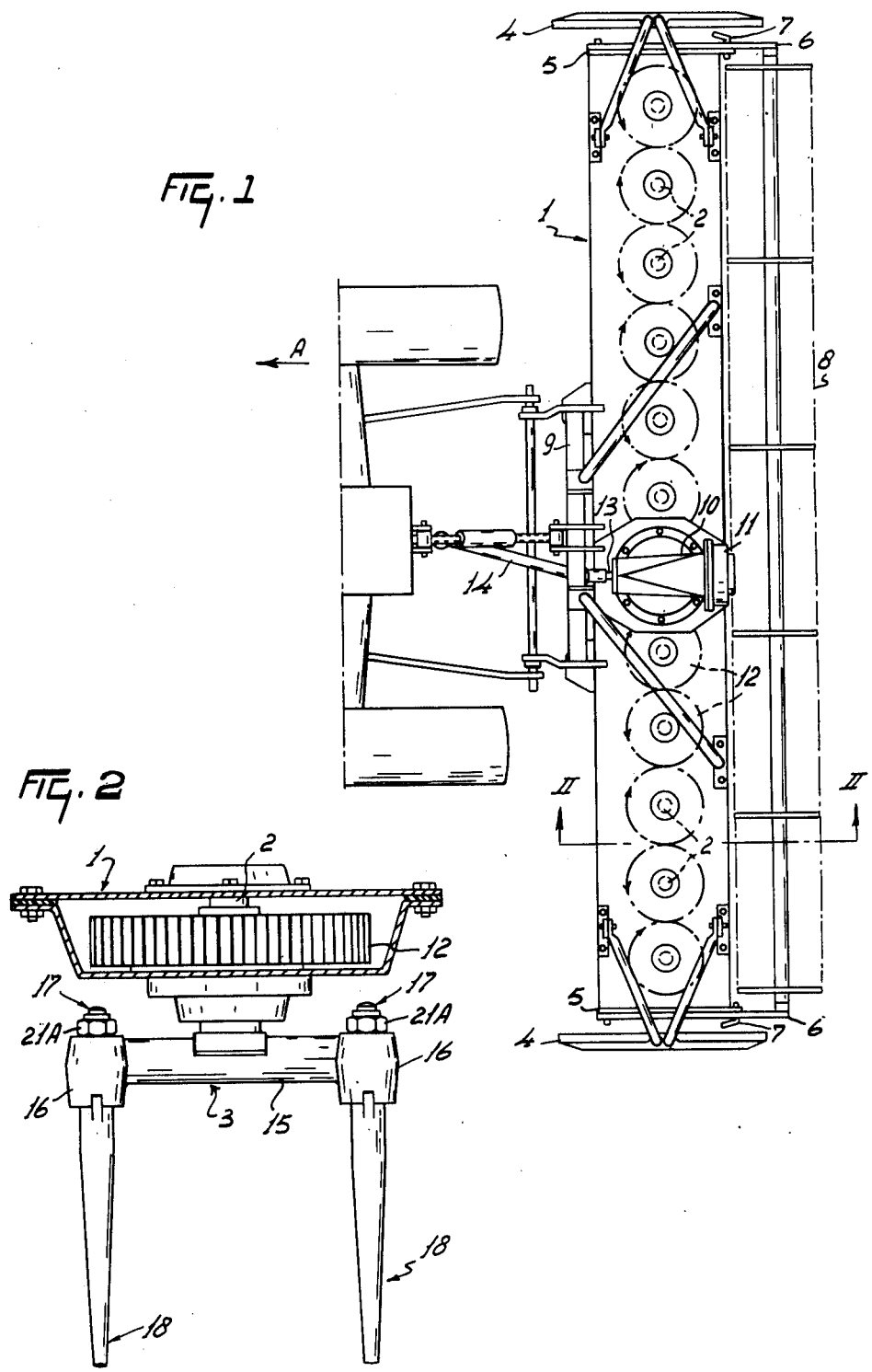

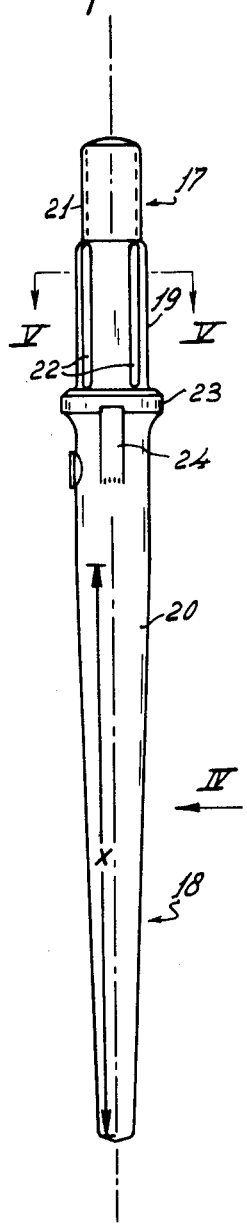
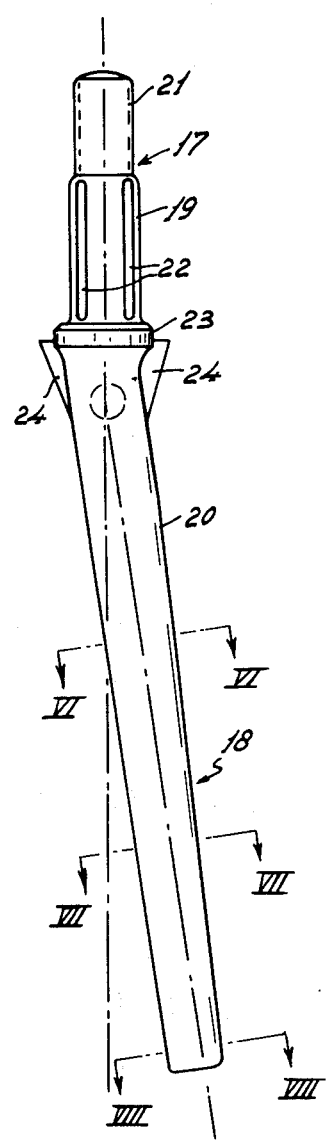
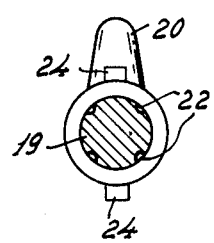
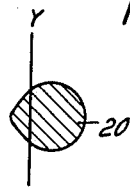
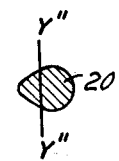

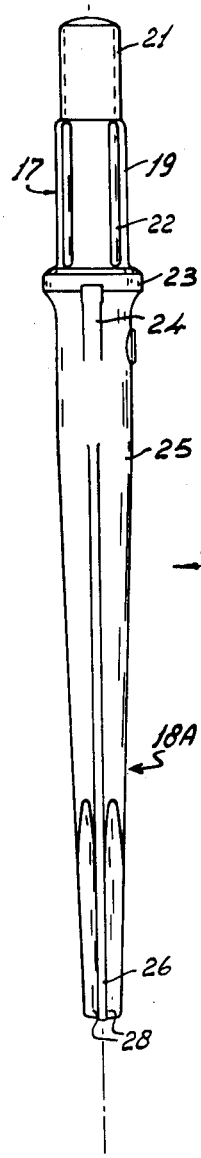
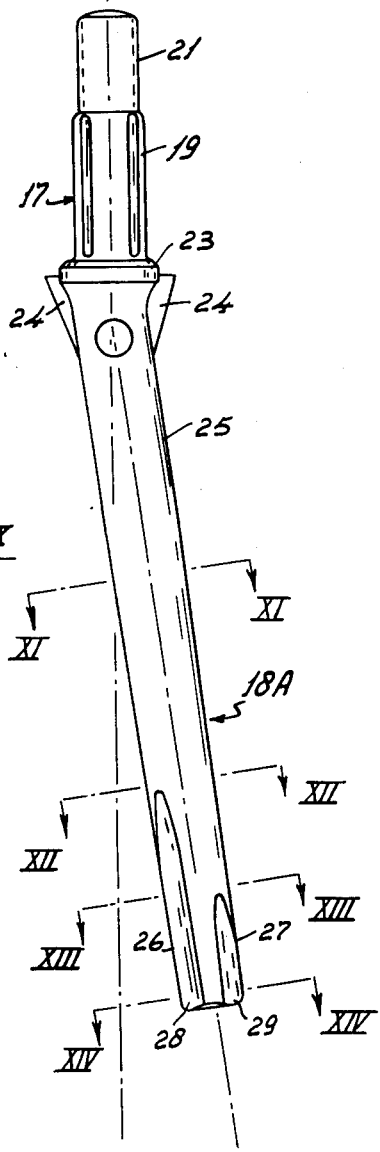
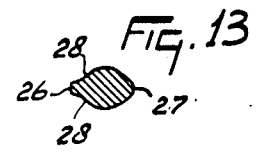

SOIL CULTIVATING TINES

For a better understanding of the invention, and to show how the same may be carried into effect, reference will now be made, by way of example, to the accompanying drawings, in which:-

FIG. 1 is a somewhat diagrammatic plan view of a rotary harrow provided with soil cultivating tines in accordance with the invention, the harrow being connected to the rear of an agricultural tractor, FIG. 2 is a section, to an enlarged scale, taken on the line II—II in FIG. 1, FIG. 3 is a side elevation, to an enlarged scale, illustrating one tine of the rotary harrow of FIGS. 1 and 2 in greater detail, FIG. 4 is an elevation as seen in the direction indicated by an arrow IV in FIG. 3, FIG. 5 is a section taken on the line V—V in FIG. 3, FIG. 6 is a section taken on the line VI—VI in FIG. 4, FIG. 7 is a section taken on the line VII—VII in FIG. 4, FIG. 8 is a section taken on the line VIII—VIII in FIG. 4, FIG. 9 is a side elevation to the same scale as FIG. 3 but illustrates an alternative soil cultivating tine in accordance with the invention, FIG. 10 is an elevation as seen in the direction indicated by an arrow X in FIG. 9, FIG. 11 is a section taken on the line XI—XI in FIG. 10, FIG. 12 is a section taken on the line XII—XII in FIG. 10, FIG. 13 is a section taken on the line XIII—XIII in FIG. 10, and FIG. 14 is a section taken on the line XIV—XIV in FIG. 10.

Referring to FIGS. 1 and 2 of the drawings, the soil cultivating implement that is somewhat diagrammatically illustrated therein is a rotary harrow which comprises a hollow frame portion 1 that extends substantially perpendicularly transverse to the intended direction of straight forward operative travel of the harrow that is indicated by an arrow A in FIG. 1. The frame portion 1 supports a plurality (in this case 12) of rotary soil working members 3 each of which revolves, during the use of the harrow, about the substantially vertical upright axis of a corresponding shaft 2 to the lowermost end of which shafts the soil working members 3 are rigidly secured. Shield plates 4 are mounted beyond the opposite lateral sides or ends of the single row of soil working members 3 that is carried by the frame portion 1 so as to be turnable upwardly and downwardly about corresponding substantially horizontal axes that extend substantially parallel to the direction A. Lower edges of the shield plates 4 slide over the ground surface during the operation of the harrow and the plates 4 serve partly to minimise ridging of soil at the opposite sides of the path of travel of the harrow and partly to guard against stones and the like being flung laterally of the harrow by its rapidly rotating soil working members 3. The opposite sides or ends of the hollow frame portion 1 carry substantially vertically disposed sector plates 5 whose rearmost curved edges, with respect to the direction A, are formed with corresponding rows of holes. Substantially horizontally aligned pivots are mounted at the fronts of the sector plates 5 with respect to the direction A and corresponding arms 6 are turnable upwardly and downwardly about those pivots alongside the sector plates 5. Substantially horizontal locking pins 7 or equivalent bolts can be entered through holes in the arms 6 and through chosen holes in the sector plates 5 to retain the arms 6 in corresponding angular settings about their substantially horizontally aligned pivotal mountings. The rearmost ends of the arms 6 with respect to the direction A rotatably carry a supporting member in the form of a ground roller 8 which roller 8 extends throughout substantially the whole of the working width of the harrow, The level of the central axis of rotation of the ground roller 8 relative to the level of the remainder of the harrow is chosen by arranging the arms 6 in appropriate angular settings relative to the sector plates 5 with the aid of the locking pins 7 or equivalent bolts in the manner which has been described above and it will be appreciated that the level which is chosen is a principal factor in determining the depth of penetration of tines 18 or 18A of the soil working members 3 into the soil during the use of the harrow.

A central region of the front of the frame portion 1 is provided with a coupling member or trestle 9 that is of generally triangular configuration exhibiting substantially horizontally aligned coupling points in a lower region and a single coupling point adjacent the apex thereof. The coupling member or trestle 9 is employed in connecting the harrow to the three-point lifting device or hitch of an agricultural tractor or other operating vehicle in the generally known manner which is illustrated in outline in FIG. 1 of the drawings. A gear box 10 is mounted on top of the frame portion 1 above one of the centre pair of soil working members 3 and an upward extension of the shaft 2 which corresponds to that soil working member 3 is located inside the gear box 10. The gear box 10 is furnished with two shafts that both extend substantially horizontally parallel to the direction A one above the other in vertically spaced apart relationship. The rearmost ends of those shafts project into a change-speed gear 11 that is secured to the rear of the gear box 10 and with the aid of which different transmission ratios between said two shafts can be obtained by mounting appropriate pairs of toothed pinions on the rear ends of the two shafts. The change-speed gear 11 is furnished with a number of interchangeable and/or exchangeable pinions of different sizes so that any one of several different transmission ratios can be selected. The upper one of the two shafts which have just been discussed is indicated by the reference 13 in FIG. 1 of the drawings and its leading splined or otherwise keyed end projects forwardly from the front of the gear box 10 and can thus be placed in driven connection with the power takeoff shaft of the operating tractor or other vehicle with which the harrow is used through the intermediary of a telescopic transmission shaft 14, which is of a construction that is known per se, having universal joints at its opposite ends. The lower one of said two shafts is drivingly connected by bevel pinions located inside the gear box 10 to the previously mentioned upward extension of the shaft 2 which corresponds to the soil working member 3 above which the gear box 10 is located. Each of the shafts 2, including the one which has just been mentioned, is provided inside the hollow frame portion 1 with a corresponding straight-or spur-toothed pinion 12 and the teeth of each pinion 12 are in mesh with those of its neighbour, or each of its neighbours, in the single row thereof. Thus, when rotary drive is transmitted to the shaft 13, all of the pinions 12 and the corresponding soil working members 3 will rotate, the arrangement being such that each pinion 12 and corresponding soil working member 3 revolves in a direction which is opposite to the direction of rotation of its neighbour, or each of its neighbours. This arrangement is indicated by arrows in FIG. 1 of the drawings. The speed of rotation of the soil working members 3 can be changed, without altering the speed of the rotary drive that is applied to the shaft 13, by altering the pinion arrangement within the change-speed gear 11.

It will be evident from FIG. 2 of the drawings that each soil working member 3 comprises a substantially horizontal tine support 15 whose central region is welded or otherwise rigidly secured to the lowermost end of the corresponding shaft 2 beneath the hollow frame portion 1. The opposite ends of each tine support 15 carry two substantially cylindrical tine holders 16 whose longitudinal axes are substantially parallel to one another and to the longitudinal axis of the corresponding shaft 2 and are consequently substantially vertically disposed. Each holder 16 receives the fastening portion 17 of a corresponding one of the tines 18 that are constructed in accordance with the present invention. Each fastening portion 17 (see FIGS. 3, 4 and 5) comprises a cylindrical part 19 that is a close fit in the interior of the corresponding holder 16, the lower end of the cylindrical part 19 of the fastening portion 17 merging integrally into an active or soil working portion 20 of the tine 18. The axial end of the cylindrical part 19 that is remote from the corresponding active or soil working portion 20, and which will normally be uppermost, terminates in a screwthreaded part 21 of the fastening portion 17. It will be noted that the cylindrical part 19 of each tine fastening portion 17 is formed throughout substantially the whole of its length with four grooves 22 that are equiangularly spaced apart from one another around the longitudinal axis of the part 19. These grooves serve a function during the manufacture of the tines 18. The junction between the fastening portion 17 and the active or soil working portion 20 of each tine 18 is provided with a shoulder 23 and said shoulder 23 and the uppermost end of the active or soil working portion 20 are furnished with two outwardly projecting lugs 24 that are angularly spaced apart from one another by substantially 180° around the longitudinal axis of the fastening portion 17. As seen in side elevation, each lug 24 is of approximately triangular configuration, said lugs 24 being provided for co-operation with notches or recesses in the lowermost ends of the tine holders 16 (FIG. 2) so that, when the lugs 24 are entered in said notches or recesses, the tines 18 cannot turn about the axes of their fastening portions 17 in the holders 16.

Each tine 18 is secured in its appointed position in one of the soil working members 3 by entering the corresponding fastening portion 17 upwardly through the selected tine holder 16 from the lowermost end thereof until the cylindrical part 19 fits snugly in the interior of that holder 16 with the screwthreaded part 21 projecting above the uppermost end of the holder and with the lugs 24 lodged in the notches or recesses at the lowermost end of the holder. The top of the shoulder 23 of the tine 18 is upwardly tapering frusto-conical configuration and bears against a matchingly shaped surface of the mouth of the interior of the holder 16 that is located at the lowermost end of that holder. A retaining nut 21A (FIG. 2) is screwed onto the part 21 of the fastening portion 17 that projects above the holder 16, said nut 21A having a downwardly directed frusto-conical surface which co-operates with a matching surface of the mouth of the interior of the holder 16 at the uppermost end thereof. It is greatly preferred that each nut 21A should be of a type which is constructed to resist loosening as a result of vibration and, accordingly, may include an insert constructed and arranged to grip the screwthread of the part 21 to prevent such loosening. However, this is not absolutely essential and each nut 21A could, for example, be a castellated nut and each part 21 be formed with a transverse bore for the reception of a split pin that will co-operate with the castellations of the nut in a known manner.

The active or soil working portion 20 of each tine 18 is of substantially right circular cylindrical configuration at its upper end but, moving downwardly therealong towards the free end or tip of said portion 20, that portion becomes gently tapering towards said free end or tip, the tapering part constituting substantially 80% of the length of the portion 20 as indicated by $x$ in FIG. 3. As will be evident from FIG. 4 of the drawings, the longitudinal axes of the fastening portions 17 and the active or soil working portion 20 are inclined to one another, an angle of substantially 8° being enclosed therebetween. The tapering part of the portion 20 has a cross-section whose periphery constitutes an arc of a circle that subtends an angle of not less than substantially 280° at the longitudinal axis of said portion 20 throughout the length of that tapering part. This arc is the segment to the right of lines Y—Y, Y'—Y' and Y"—Y" of FIGS. 6, 7 and 8 respectively. FIGS. 6, 7 and 8 of the drawings are cross-sections taken at different levels along the tapering part of the active or soil working portion 20 and it will be seen from those Figures that, in addition to a progressive reduction in cross-sectional area towards the lowermost free end or tip of the portion 20, that cross-section becomes progressively more pear-shaped towards said free end or tip. The non-curved part of each cross-section constitutes a rib that is located at the front of the portion 20 with respect to the intended direction of rotation of the soil working member 3 concerned (see the previously mentioned arrows in FIG. 1 of the drawings). The rib has a rounded, rather than sharply angular, leading edge and extends throughout substantially the whole of the upright length of the tapering part of the active or soil working portion 20.

FIGS. 9 to 14 of the drawings illustrate an alternative soil cultivating tine 18A in accordance with the invention which tine 18A is similar or identical in many respects to the tine 18 that has already been described. Accordingly, the same references are used in FIGS. 9 and 10 of the drawings as are employed in FIGS. 2 to 5 thereof to denote such common features. In the embodiment of FIGS. 9 to 14, the tine 18A has an active or soil working portion 25 whose uppermost end is of substantially right circular cylindrical configuration. However, moving downwardly along said portion 25, that portion progressively assumes a substantially polygonal cross-section whose precise shape, at various levels, can be seen in FIGS. 11, 12, 13 and 14 of the drawings respectively. In this embodiment, an angular rib 26 is formed at the front of the tapering part of the active or soil working portion 25 with respect to the intended direction of operative rotation of the corresponding soil working member 3 and it will be seen from FIGS. 9 to 14 of the drawings that said rib 26 has a substantially flat leading edge as compared with the rounded leading edge of the rib described in connection with the preceding embodiment. Towards the free end or tip of the active or soil working portion 25, the cross-section of that portion becomes progressively more angular or polygonal in outline so that, as can be seen in FIGS. 10, 13 and 14 of the drawings, a second flatedged rib 27 is formed at the rear of the tine portion 25 with respect to the intended direction of operative rotation of the corresponding soil working member 3 that has been mentioned above. The rib 27 is to be found only in a short lowermost free end or tip, region of the tine portion 25 whereas the leading rib 26 extends throughout substantially the whole of the upright length of the tapering part of said portion 25.

At a location close to the free end or tip of the tine portion 25, that is to say, at substantially the level of the cross-section of FIG. 14, the tine has been tapered and flattened to an extent such that a diagonal (as seen in FIG. 14) interconnecting the ribs 26 and 27 has substantially twice the length of a relatively perpendicular diagonal. Inwardly recessed leading grooves 28 and trailing grooves 29 are formed in what would otherwise be the four substantially, but not completely, flat sides of the tine portion 25 at the level of the cross-section of FIG. 14 and it will be seen from FIGS. 10, 13 and 14 that the leading grooves 28 extend upwardly from the lowermost free end or tip of the tine at opposite sides of the leading rib 26 through a distance which is approximately twice the extent from said free end or tip of the trailing grooves 29 at opposite sides of the rear rib 27. The grooves 28 and 29 are located substantially centrally of the surfaces in which they are formed and cover most of those surfaces in the region of the tine portion 25 at which the cross-section of FIG. 14 is taken. In the embodiment of FIGS. 9 to 14 of the drawings, the cross-section of the tapering part of the tine portion 25 is progressively flattened towards the lowermost free end or tip thereof until the substantially two-to-one ratio between perpendicular diagonals, as seen in FIG. 14 of the drawings, is reached close to the lowermost free end or tip of the tine. When the tines 18A are in their operative positions, the longer diagonal of each tine, as seen in FIG. 14 of the drawings, extends substantially tangentially with respect to a circle centered upon the axis of rotation of the corresponding soil working member 3. The corners (as seen in FIG. 14) that lie between the ribs 26 and 27 are rounded off between the grooves 28 and 29.

The soil cultivating tines 18 and 18A that have been described have sufficient strength to withstand all of the mechanical forces that are likely to be exerted upon them during their use but their construction is such that there is no wastage of the material from which they are formed. Their active or soil working portions 20 and 25 are shaped in such a way that they will cut readily through the soil during use, the resistance to their passage through the soil not being excessive. Even under operating circumstances in which a harrow or other soil cultivating implement of which the tines 18-18A form a part moves relatively rapidly in the direction A (FIG. 1) while the soil working members 3 rotate about the axes of the shafts 2 at a low speed (in response to appropriate adjustment of the change-speed gear 11 and/or a reduced speed of rotation applied to the shaft 13), the portions 20/25 of the tines 18/18A will still have sufficient strength to prevent them from becoming bent or broken.

Although certain features of the soil cultivating tines that have been described and/or that are illustrated in the accompanying drawings will be set forth in the following claims as inventive features, it is emphasised that the invention is not necessarily limited to those features and that it includes within its scope each of the parts and portions of each tine that has been described and/or illustrated in the accompanying drawings both individually and in various combinations.

What we claim is:

1. A tine for use in a rotary harrow or cultivator comprising an upper fastening portion and a lower elongated soil-working portion that merges into said upper portion at a junction, said soil-working portion tapering downwardly to a tip and at least a majority of its tapering length having a cross-section with a periphery, a segment of that periphery forming an arc with its center of curvature at the longitudinal axis of the soil-working portion, said arc comprising more than half of said periphery and the remainder of the periphery being noncircular and defining a rounded rib, said rib being located at the leading side of the soil-working portion with respect to the normal direction of rotation of said tine.

2. A tine as claimed in claim 1, wherein said arc subtends an angle of at least 280° around the longitudinal axis of said soil-working portion.

3. A tine as claimed in claim 1, wherein at least half of the length of said soil-working portion tapers downwardly and substantially all of the tapering length has a cross-section with a periphery segment that forms an arc.

4. A tine as claimed in claim 3, wherein the tapering length of said soil-working portion is about 80 percent of the total length of that portion.

5. A tine as claimed in claim 1, wherein said arc subtends a progressively larger angle at locations further from said tip towards said junction.

6. A tine for use in a rotary harrow or cultivator comprising an elongated upper fastening portion and a lower elongated substantially straight soil-working portion that merges into said upper portion at a junction, said soil-working portion tapering downwardly to a tip and at least a majority of its tapering length having a cross-section with a periphery, a segment of that periphery forming an arc with its center of curvature at the longitudinal axis of the soil-working portion, said arc comprising more than half of said periphery and the remainder of the periphery being noncircular and defining a rounded rib, said rib being located at the leading side of the soil-working portion with respect to the normal direction of rotation of said tine, said fastening portion being angled with respect to said soil-working portion and the latter having a shoulder with lug means located adjacent said junction.

\* \* \* \* \*